United States Patent [19]

Leuchten et al.

[11] Patent Number: 4,803,108

[45] Date of Patent: Feb. 7, 1989

[54] HONEYCOMB REINFORCING SHEET FOR THE REINFORCEMENT OF PANELS AND METHOD OF REINFORCING PANELS

[75] Inventors: William E. Leuchten, Mountain Lake; Robert P. Kretow, Howell, both of N.J.

[73] Assignee: Essex Specialty Products, Inc., Clifton, N.J.

[21] Appl. No.: 44,885

[22] Filed: May 1, 1987

[51] Int. Cl.⁴ .............................................. B32B 3/12
[52] U.S. Cl. ..................................... 428/118; 52/806; 428/40; 428/131
[58] Field of Search ................. 428/73, 116, 117, 118, 428/593, 131; 52/806

[56] References Cited

U.S. PATENT DOCUMENTS

| | | | |
|---|---|---|---|
| 3,529,693 | 9/1970 | Woodward et al. | 428/116 X |
| 3,553,054 | 1/1971 | Maus | 428/116 X |
| 3,695,968 | 10/1972 | Morrison | 428/116 X |
| 3,707,583 | 12/1972 | McKown | 428/116 X |
| 3,744,835 | 7/1973 | Carbone et al. | 428/116 X |
| 3,784,395 | 1/1974 | McKown | 428/118 X |
| 3,817,808 | 6/1974 | Ronan et al. | 428/116 X |
| 3,834,482 | 8/1974 | Wada et al. | 428/118 X |
| 3,895,152 | 7/1975 | Carlson et al. | 428/116 |
| 4,086,378 | 4/1978 | Kam et al. | 428/116 X |
| 4,136,846 | 1/1979 | Brault | 428/116 X |
| 4,197,341 | 4/1980 | Rule | 428/593 X |
| 4,284,457 | 8/1981 | Stonier et al. | 428/116 X |
| 4,292,375 | 9/1981 | Ko | 428/593 |
| 4,369,608 | 1/1983 | Miura et al. | 52/309.9 |
| 4,374,890 | 2/1983 | Shimizu et al. | 428/212 |
| 4,378,395 | 3/1983 | Asoshina et al. | 428/212 X |
| 4,382,106 | 5/1983 | Royster | 428/116 X |
| 4,444,818 | 4/1984 | Tominaga et al. | 428/220 X |
| 4,473,419 | 9/1984 | Hardy | 428/63 X |
| 4,542,056 | 9/1985 | Anglin et al. | 428/116 |
| 4,555,134 | 11/1985 | Gruna | 296/189 |
| 4,569,880 | 2/1986 | Nishiyama et al. | 428/212 |
| 4,572,862 | 2/1986 | Ellis | 428/245 |
| 4,581,267 | 4/1986 | Miller | 428/40 |
| 4,639,388 | 1/1987 | Ainsworth et al. | 428/117 |
| 4,643,933 | 2/1987 | Picken | 52/806 X |

FOREIGN PATENT DOCUMENTS 2934430  3/1981  Fed. Rep. of Germany.

OTHER PUBLICATIONS

Translation of Japanese Early-Publication No. 56-136869 Oct. 26, 1981.
Translation of Japanese Early-Publication No. 58-118878 Jul. 15, 1983.
Commerical data sheets relating to shaped aluminum honeycomb (American Cyanamic) bonded sandwich construction honeycomb (Hexcel) and structural values for military and commercial grades of aluminum honeycomb (Dura-Core).

*Primary Examiner*—Henry F. Epstein
*Attorney, Agent, or Firm*—Curtis, Morris & Safford

[57] ABSTRACT

A reinforcing sheet adaptable to the reinforcement of a panel formed of metal, plastic or sheet molding compound, which reinforcing sheet contains a perforated honeycomb member with a thermosetting adhesive layer on each side of the honeycomb member and a reinforcement backing adhered to one of the adhesive layers, the other adhesive layer being applied to the panel to be reinforced. The reinforcing sheet provides excellent flexural reinforcement and impact absorbing properties and is advantageously used to reinforce cold rolled steel, such as an automobile panel.

17 Claims, 1 Drawing Sheet

HONEYCOMB REINFORCING SHEET FOR THE REINFORCEMENT OF PANELS AND METHOD OF REINFORCING PANELS

FIELD OF THE INVENTION

The present invention relates to a reinforcing sheet for the reinforcement of a panel formed of metal, plastic or sheet molding compound and to a method for reinforcing a panel formed of metal, plastic or sheet molding compound with the reinforcing sheet.

More specifically, this invention relates to a reinforcing sheet providing improved flexural strength and impact resistance for a cold rolled steel panel, such as an automobile panel, and to a method for reinforcing a cold rolled steel panel using such a reinforcing sheet.

BACKGROUND OF THE INVENTION

From the standpoint of resource and energy savings, for example in the automotive industry, it is desirable to reduce vehicle body weight. However, attempts to reduce weight by reducing the thickness of metal panels result in deterioration in strength. For example, in the case of quarter panels for automobiles, such attempts have created problems such as low strength at various points (particularly flexural strength). Insufficiently rigid outer panels buckle and bend with minimum applied stress. In addition, thin outer panels exhibit poor impact absorbing properties.

In order to solve such problems, it is necessary to develop a suitable way to reinforce such structures. Reinforcement with a heavy metal panel is contradictory to the purpose of vehicle weight reduction. Hence, it has been proposed to reinforce the outer panels entirely or partly with lightweight resin materials.

Reinforcement comprised of thermosetting adhesive layers and a reinforcing material has been applied to steel panels for use in the production of the body of automobiles. Such reinforcement provides increased strength against force applied to the outside surfaces of the automobile body.

For example, U.S. Pat. No. 4,369,608 describes a door for an automobile wherein a main reinforcing member made of a thermosetting resin is bonded to the inner side of an outer metal panel of the door to improve the strength and rigidity of the door. A multilayer sheet-like auxiliary reinforcing member, preferably made of a glass fabric, is bonded to the main reinforcing member.

Typically, the reinforcing sheet is adhered under pressure, for example to the back surface of the metal panel to be reinforced, and thereafter cured by usual heating methods, e.g. by heating in a hot air circulation type heating oven, in an infrared ray heating oven or with a radio frequency induction heating coil. This heat curing treatment can be carried out simultaneously at a stage in a vehicle assembly line at which painted metal panels, having a reinforcing sheet thereon, are baked to cure the paint.

The reinforcing sheet may be premolded to conform its shape with that of the metal panel to be reinforced. Preferably, the reinforcing sheet has sufficient flexibility so as to conform to the shape of the metal panel upon its application to the metal panel without premolding.

However, the use of conventional reinforcing adhesive sheets containing thermosetting resins for reinforcing a metal panel has shortcomings.

Conventional reinforcing adhesive sheets must be reasonably thick in order to obtain the desired strength and impact resistance. Simply bonding thin resin sheet material to the metal panel may not provide adequate flexural reinforcement and impact resistance. If the thickness of the resin sheet is increased, the weight will also be increased. If packing is used between the resin sheet material and the panel to insure sufficient thickness, the reinforcing member will conform poorly to the shape of the panel, or will have a complicated structure. Wave-like or bead-like projections provided on the main reinforcing member, which projections function as ribs of the metal panel to be reinforced, cause similar disadvantages and only moderate increases in flexural reinforcement.

It can thus be readily appreciated that provision of a reinforcing sheet which provides improved flexural reinforcement and impact resistance to a cold rolled steel panel as compared to conventional reinforcing sheets and eliminates the previously discussed problems would be a highly desirable advance over the current state of panel reinforcement technology.

OBJECTS OF THE INVENTION

It is an object of this invention to provide a reinforcing sheet for the reinforcement of a panel formed of metal, plastic or sheet molding compound, which reinforcing sheet provides improved flexural reinforcement and impact resistance for the panel without an unacceptable increase in weight as compared to conventional reinforcing sheets.

It is a second object of this invention to provide a reinforcing sheet which contains a lightweight honeycomb member positioned within the sheet such that the thickness and reinforcing capacity of the reinforcing sheet are increased without an unacceptable weight increase that would limit its utility in automotive applications.

It is an additional object of this invention to provide such a reinforcing sheet containing a honeycomb member for the reinforcement of a panel, which sheet is sufficiently flexible to conform to the shape of the panel to be reinforced.

It is also an object of the invention to provide a method for reinforcing a panel formed of metal, plastic or sheet molding compound by using a reinforcing sheet containing a honeycomb member.

It is a further object of the invention to provide a reinforced panel which exhibits improved resistance to impact, buckling and bending compared to an unreinforced panel or a panel reinforced by a conventional reinforcing sheet without a honeycomb member.

These and other objects and advantages of the present invention will become more readily apparent after consideration of the following.

STATEMENT OF THE INVENTION

In one aspect the present invention is directed to a reinforcing sheet for the reinforcement of a panel formed of metal, plastic or sheet molding compound, which reinforcing sheet comprises a perforated honeycomb member having columns that define cell apertures with open ends, a first thermosetting adhesive layer present on one end of said columns, a second thermosetting adhesive layer present on the other end of said columns, and a reinforcement backing adhered to the second thermosetting adhesive layer.

In a further aspect the present invention relates to a method for reinforcing a panel formed of metal, plastic or sheet molding compound, which method comprises applying to the panel a reinforcing sheet containing a perforated honeycomb member having columns that define cell apertures with open ends, a first thermosetting adhesive layer present on one end of said columns facing the panel to be reinforced, a second thermosetting adhesive layer present on the other end of said columns, and a reinforcement backing adhered to the second thermosetting adhesive layer, and then heating the reinforcing sheet to the curing temperature of the thermosetting adhesive to harden the reinforcing sheet and bond the first thermosetting adhesive to the panel to be reinforced.

BRIEF DESCRIPTION OF THE DRAWINGS

The present invention, as well as other objects and features thereof, will be understood more clearly and fully from the following description of certain preferred embodiments, when read with reference to the accompanying drawing, in which.

DESCRIPTION OF CERTAIN PREFERRED EMBODIMENTS

Figure 1:
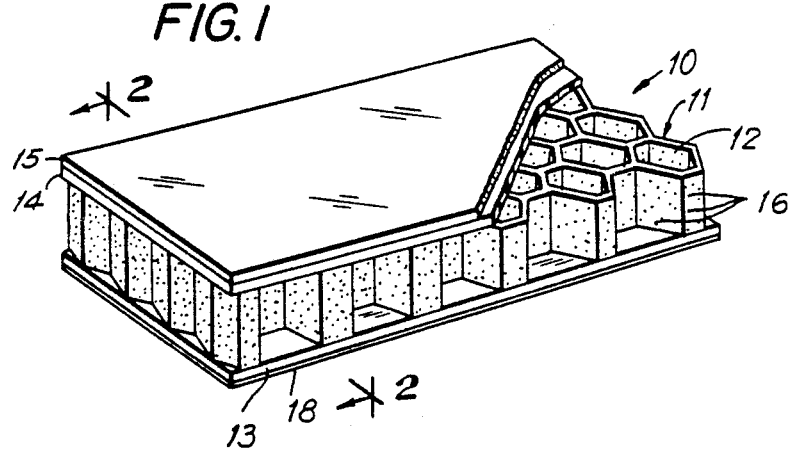
FIG. 1 is a perspective view of a reinforcing sheet partially cut away to show interior detail.
Figure 2:
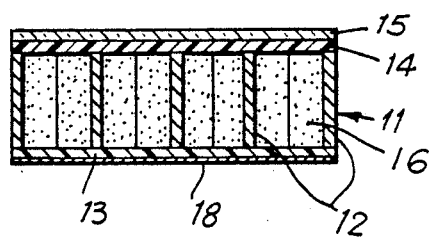
FIG. 2 is a cross sectional view taken along lines 2—2 in FIG. 1.

With reference now to FIGS. 1 and 2, reinforcing sheet 10 for the reinforcement of a panel formed of metal, plastic or sheet molding compound, includes perforated honeycomb member 11 having columns 12 that define cell apertures with open ends, first thermosetting adhesive layer 13 present on one end of columns 12 and second thermosetting adhesive layer 14 present on the other end of columns 12.

Reinforcement backing 15, suitably in the form of a layer, is adhered to the second thermosetting adhesive layer 14. Preferably, the reinforcement backing is a woven glass fabric. The woven glass fabric increases the reinforcing strength of the reinforcing sheet. The woven glass fabric preferably has a thickness of 0.005 inch to 0.050 inch.

Reinforcing sheet 10 is adhered to the panel to be reinforced by contacting first thermosetting adhesive layer 13 with the panel and pressing. The panel with applied reinforcing sheet 10 is then heated to the curing temperature of the thermosetting adhesives to harden reinforcing sheet 10 on the panel and to bond reinforcing sheet 10 to the panel.

Columns 12 of honeycomb member 11 suitably are formed of any material that remains stable up to the curing temperature of the thermosetting adhesive and exhibits sufficient adhesion to the thermosetting adhesive layer and sufficient flexibility to conform to the shape of the panel to be reinforced. Advantageously, columns 12 are formed of a metal alloy plate. Because of its light weight, corrosion resistance, ready accessibility, inexpensive cost and high flexibility, aluminum is most preferred for forming columns 12 of honeycomb member 11.

Columns 12 are integrally connected to form a multitude of cell apertures with open ends. Honeycomb member 11 has been shown as comprising a multitude of hollow hexagonal cells, but the invention is not limited to this form of honeycomb member. Similar suitable structures comprising a multitude of hollow cells of cylindrical, triangular, square, polyhedral or other shapes are also covered by this invention.

Columns 12, and in particular the preferred aluminum honeycomb columns, are sufficiently thick, and the cell apertures defined by columns 12 likewise have a suitable cell size and core density, such that the honeycomb member 11 maintains its integrity in forming reinforcing sheet 10 and applying reinforcing sheet 10 to the panel to be reinforced without sacrificing the flexibility and capacity of reinforcing sheet 10 to conform to the shape of the panel and without unacceptably increasing the weight of reinforcing sheet 10 for use in automotive applications. The aluminum honeycomb columns suitably have a thickness of 0.0005 inch to 0.005 inch, preferably 0.0007 inch to 0.004 inch. The cell apertures defined by columns 12 suitably have a cell size of 1/16 inch to ⅜ inch, preferably 3/16 inch to 5/16 inch, and a core density of 1.0 pound per cubic foot to 12.0 pounds per cubic foot, preferably 3.0 pounds per cubic foot to 8.0 pounds per cubic foot.

The height of columns 12, that is, the thickness of honeycomb member 11, affects the stiffness of the uncured reinforcing sheet and the flexural reinforcement and impact resistance of the sheet for the panel to be reinforced. The thicker the honeycomb member, the greater the resistance to deflection of the reinforced panel. However, the flexibility of the reinforcing sheet decreases and its weight increases as the thickness of the honeycomb member increases. The honeycomb member suitably has a thickness of 1/16 inch to 4 inches, preferably ⅛ inch to ¾ inch.

Honeycomb member 11 of reinforcing sheet 10 may be flat or contoured, for example by rolling, forming or carving operations, to conform to the shape of the panel to be reinforced.

Columns 12 of honeycomb member 11 must be formed of a perforated material containing perforations 16 to allow gas to escape from the cell apertures during curing. This gas would otherwise be trapped in the cell apertures since the open ends of the honeycomb member are necessarily covered and closed by the adhesive layers.

First thermosetting adhesive layer 13 has a thickness sufficient to bond the reinforcing sheet to the panel. Second thermosetting adhesive layer 14 has a thickness sufficient to adhere reinforcement backing 15 to honeycomb member 11. Suitably each of the thermosetting adhesive layers has a thickness of 0.02 inch to 0.20 inch, preferably 0.03 inch to 0.10 inch.

Figure 3:
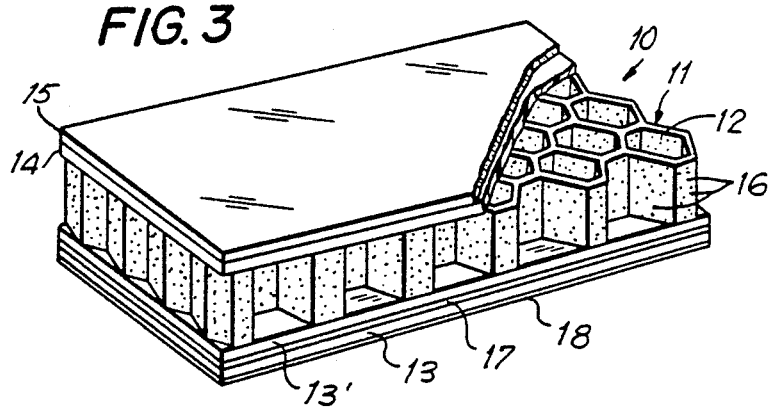
FIG. 3 is a perspective view of a further embodiment of a reinforcing sheet.

With reference now to FIG. 3, in a further embodiment moisture impermeable barrier 17 is embedded in first thermosetting adhesive layer 13, 13'. As described in U.S. application Serial No. 014,636 filed Feb. 13, 1987, moisture impermeable barrier 17 acts to prevent moisture from adversely affecting thermosetting adhesive layer 13 in contact with the panel to be reinforced after reinforcing sheet 10 is applied to the panel.

For example, upon storage of the panel with applied reinforcing sheet 10, especially under humid conditions, moisture may be absorbed by an unprotected thermosetting adhesive layer 13' through, for example, perforations 16 in columns 12. Such absorption of moisture may cause decomposition of the curing agents in the thermosetting adhesive layer and gassing of the thermosetting adhesive layer upon curing. However, migration of the moisture to protected thermosetting adhesive layer 13 is prevented by moisture impermeable barrier 17. In this manner, the adverse effects of moisture are avoided in protected thermosetting adhesive layer 13 (except for possibly in an inconsequential degree around the edges of the reinforcing sheet itself).

Any material that is moisture impermeable, remains stable up to the curing temperature, and exhibits sufficient adhesion to the thermosetting adhesive layer and sufficient flexibility to conform to the shape of the panel to be reinforced can be used as moisture impermeable barrier 17. A metal foil, such as aluminum, tin, copper, zinc, brass, steel or iron foil, can be advantageously used as moisture impermeable barrier 17. Because of its ready accessibility, inexpensive cost and high flexibility, aluminum foil is most preferred.

Moisture impermeable barrier 17, and in particular the aluminum foil used as the moisture impermeable barrier, must have sufficient thickness to maintain its integrity in order to prevent moisture from migrating to protected thermosetting adhesive layer 13. However, moisture impermeable barrier 17 must not have so great a thickness that its flexibility and capacity to conform to the shape of the panel to be reinforced are sacrificed. If aluminum foil is used as the moisture impermeable barrier, it suitably has a thickness of 0.0005 inch to 0.003 inch, more preferably 0.0008 inch to 0.002 inch, most preferably 0.001 inch.

Preferably, moisture impermeable barrier 17 is embedded approximately midway between the surface of the thermosetting adhesive layer 13 which comes in contact with the panel to be reinforced and the surface of thermosetting adhesive layer 13' which binds to honeycomb member 11. Each of adhesive layers 13 and 13' has a thickness sufficient to bond the reinforcing sheet to the panel and to adhere the honeycomb member. Preferably, the combined adhesive layer 13, 13' has a thickness of 0.02 inch to 0.20 inch, preferably 0.03 inch to 0.10 inch, and at least 0.01 inch of the adhesive is provided on each side of the moisture impermeable barrier.

Thermosetting adhesive layers 13 and 14 may be of the same or different compositions. Preferably, the two thermosetting adhesive layers are of the same composition.

In a preferred embodiment, thermosetting adhesive layers 13 and 14 each are formed of an epoxy resin and a curing agent. Advantageously, a mixture of cycloaliphatic epoxides, epoxidized novolac resins, epoxidized bisphenol A or bisphenol F resins, butanediol diglycidyl ether, neopentyl glycol diglycidyl ether or flexibilizing epoxy resins can be used. These resins can be reacted with carboxy terminated butadiene acrylonitrile to produce rubber modified epoxy resins. The diglycidyl ether of bisphenol A and the diglycidyl ether of bisphenol A reacted with carboxy terminated butadiene acrylonitrile to produce a crosslinkable resin with improved peel strength and impact resistance are preferably used as the epoxy resin. Advantageously, Lewis acids, substituted imidazoles or amine salts can be used as curing agents. Preferably, dicyandiamide is used as the curing agent.

Thermosetting adhesive layers 13 and 14 each can include a plasticizer for impact and thermal shock resistance improvement. Advantageously, benzoates, adipates and phthalates can be used as the plasticizer. A phthalate, for example dibutyl phthalate, is preferred.

In addition, thermosetting adhesive layers 13 and 14 each can further contain a flame retardant, such as a halogenated epoxy, hydrated alumina or antimony oxide; a flow control agent, such as clay or fumed silica; or a filler, such as glass, phenolic or aluminum oxide bubbles, preferably glass bubbles. Such fillers further serve as a low density reinforcing agent. Other fillers such as talcs, carbonates, silicates and aluminum oxide powder can be used to modify impact, reinforcement and adhesion characteristics. Still other fillers such as ferrites can be used to impart magnetic properties to the adhesive sheet.

The thermosetting adhesive is advantageously formed of 100 parts by weight of epoxy resin, 3 to 15 parts by weight of curing agent, 0 to 30 parts by weight of plasticizer, 0 to 15 parts by weight of clay filler and 0 to 60 parts by weight of glass bubbles.

The thermosetting adhesive suitably cures at about 160° to 220° C. The thermosetting adhesive composition may also include a catalyst compatible with the curing agent for curing the composition at lower temperatures. An appropriate catalyst is a substituted urea catalyst, preferably phenyl dimethyl urea. With such a catalyst, the adhesive cures at about 120° to 180° C.

First thermosetting adhesive layer 13 is advantageously covered with release sheet 18, preferably release paper, to facilitate handling of reinforcing sheet 10 and to prevent contamination of the adhesive of the reinforcing sheet prior to its application to the panel to be reinforced. The release sheet can be removed just prior to applying the reinforcing sheet to the panel.

Reinforcing sheet 10 advantageously is prepared by spreading first thermosetting adhesive layer 13 onto release paper 18 with a coating knife to a uniform thickness suitably of 0.02 inch to 0.20 inch, preferably 0.03 inch to 0.10 inch. Perforated honeycomb member 11 is then placed on first thermosetting adhesive layer 13. Optionally, first thermosetting adhesive layer 13 may be spread onto release paper 18 in two coats (adhesive layers 13 and 13'), with moisture impermeable barrier 17 placed between and embedded within the two coats.

Second thermosetting adhesive layer 14 is pumped onto reinforcement backing 15, such as the woven glass fabric, and spread with a coating knife to form a layer of uniform thickness suitably of 0.02 inch to 0.20 inch, preferably 0.03 inch to 0.10 inch, and to adhere reinforcement backing 15 to second thermosetting adhesive layer 14.

The open side of perforated honeycomb member 11 is then placed on the free side of second thermosetting adhesive layer 14 (opposite the side of thermosetting adhesive layer 14 adhered to reinforcement backing 15) to complete the manufacture of reinforcing sheet 10.

To apply reinforcing sheet 10 to the panel to be reinforced, release sheet 18 is removed from reinforcing sheet 10 and reinforcing sheet 10 is applied to the panel by contacting the exposed side of first thermosetting adhesive layer 13 with the panel. Reinforcing sheet 10 has sufficient flexibility and thickness to conform to the shape of the panel to be reinforced.

Alternatively, a second release sheet (not shown) can be placed on the free side of second thermosetting adhesive layer 14 (opposite the side adhered to reinforcement backing 15) in place of the open side of perforated honeycomb member 11. In this embodiment, reinforcing sheet 10 would be applied to the panel to be reinforced in two steps. First, release sheet 18 is removed from first thermosetting adhesive layer 13 and the exposed side of first thermosetting adhesive layer 13 (opposite perforated honeycomb member 11) is applied to the panel. Next, the second release sheet is removed from second thermosetting adhesive layer 14 and the exposed side of second thermosetting adhesive layer 14 (opposite reinforcement backing 15) is applied to the open side of perforated honeycomb member 11 to complete the manufacture of reinforcing sheet 10 on the panel itself.

A panel with a reinforcing sheet applied to the panel can be heated to the curing temperature of the thermosetting adhesive, preferably to a temperature of 120° to 220° C., to harden the reinforcing sheet. The thermosetting adhesive according to the present invention exhibits controlled flow during early stages of cure. Accordingly, thermosetting adhesive layers 13 and 14 do not flow along columns 12 into the cell apertures during curing. Thus, first thermosetting adhesive layer 13 maintains good adhesion to honeycomb member 11 and the panel to be reinforced and second thermosetting adhesive layer 14 maintains good adhesion to honeycomb member 11 and reinforcement backing 15 during and after curing of the thermosetting adhesive.

Further objects of this invention, together with additional features contributing thereto and advantages accruing therefrom, will be apparent from the following example of the invention.

EXAMPLE

A reinforcing sheet containing a perforated aluminum honeycomb member was constructed according to the invention. The aluminum honeycomb member had a thickness of ⅜ inch, a cell size of ¼ inch and a core density of 4.3 pounds per cubic foot. The aluminum had a thickness of 0.002 inch. The thermosetting adhesive layers each were formed of 30 parts by weight of the diglycidyl ether of bisphenol A, 70 parts by weight of the diglycidyl ether of bisphenol A reacted in a 3:2 weight ratio with carboxy terminated butadiene acrylonitrile, 7 parts by weight of a phthalate plasticizer, 6 parts by weight of dicyandiamide curing agent, 7 parts by weight of clay, and 20 parts by weight of glass bubbles. The reinforcing sheet contained a woven glass fabric adhered to the surface of the thermosetting adhesive layer opposite the side of the reinforcing sheet to be applied to the panel to be reinforced.

A comparative sample was prepared in an identical manner to the sample according to the invention except omitting the honeycomb member.

A 4 inches wide by 12 inches long piece of the reinforcing sheet according to the invention was applied to a first cold rolled steel metal panel of dimensions 4 inches wide by 12 inches long by 0.030 inch thick. Similarly, a 4 inches wide by 12 inches long sample of the comparison reinforcing sheet without the honeycomb member was applied to an identical second cold rolled steel metal panel of dimensions 4 inches wide by 12 inches long by 0.030 inch thick.

The two samples were then heated in a forced draft oven at 200° C. for 0.5 hour to cure and harden the thermosetting adhesive.

The following test results compare the flexural reinforcement properties of an unreinforced metal panel, the metal panel reinforced by a polymer/woven glass reinforcing sheet without the honeycomb member and the metal panel reinforced by the reinforcing sheet according to the invention, measured at 74° F. at a load rate of 0.2 inch per minute on a support span of 5 inches.

TABLE

Flexural Reinforcement Properties of Cold Rolled Steel Panel

|  | Unreinforced | Without Honeycomb | With Honeycomb |
| --- | --- | --- | --- |
| Load at 0.1 in. deflection, lbs. | 8 | 40 | 800 |
| Maximum load bearing capacity, lbs. | 30 | 190 | 850 |
| Deflection at maximum load, in. | 1.0 | 0.50 | 0.11 |

The panel reinforced by the reirforcing sheet according to the invention exhibited improved resistance to impact, buckling and bending compared to an unreinforced panel or a panel reinforced by a reinforcing sheet without a honeycomb member.

The ability of the cold rolled steel to withstand initial flexural loads with the reinforcing sheet according to the invention was increased by 100 times over unreinforced cold rolled steel and by 20 times over cold rolled steel reinforced by a reinforcing sheet without the honeycomb member.

After peak load was obtained the cold rolled steel with the reinforcing sheet according to the invention continued to withstand from 500 pounds to 300 pounds of stress as the honeycomb crushed to 0.8 inches of deflection. Thus the honeycomb reinforced steel can resist higher loads over greater deflections than steel reinforced solely with polymer and woven glass. The continued deflection increases with greater thickness of the honeycomb member.

What is claimed is:

1. A reinforcing sheet adaptable to the reinforcement of a panel formed of metal, plastic or sheet molding compound, which reinforcing sheet comprises:
    a first reinforcing member which includes a honeycomb member having columns that define cell apertures with open ends and a first thermosetting adhesive layer present on one end of said columns for applying the honeycomb member to the panel; and
    a second reinforcing member which includes a second thermosetting adhesive layer present on the other end of said columns and a reinforcement backing adhered to the second thermosetting adhesive layer,
    said open ends of the honeycomb member being covered by the adhesive layers and
    said honeycomb member having perforations for allowing gas to escape from the cell apertures during curing of the first and second thermosettng adhesive layers.

2. A reinforcing sheet as in claim 1 wherein the reinforcement backing is a woven glass fabric.

3. A reinforcing sheet as in claim 1 wherein the first and second thermosetting adhesive layers each comprise an epoxy resin and a curing agent.

4. A reinforcing sheet as in claim 3 wherein the first and second thermosetting adhesive layers each further comprise a plasticizer.

5. A reinforcing sheet as in claim 4 wherein the first and second thermosetting adhesive layers each further comprise a flow control agent and a filler.

6. A reinforcing sheet as in claim 3 wherein the first and second thermosetting adhesive layers each further comprise a catalyst for curing the thermosetting adhesive layers.

7. A reinforcing sheet as in claim 1 further comprising a release paper laminated on the first thermosetting adhesive layer on the surface of the first thermosetting adhesive layer to be applied to the panel to be reinforced.

8. A reinforcing sheet as in claim 3 wherein the thermosetting adhesive layer cures at a temperature of 160° to 220° C.

9. A reinforcing sheet as in claim 6 wherein the thermosetting adhesive layer cures at a temperature of 120° to 180° C.

10. A reinforcing sheet as in claim 1 further comprising a moisture impermeable barrier embedded in the first thermosetting adhesive layer.

11. A reinforcing sheet as in claim 1 wherein the columns are formed of a metal alloy plate.

12. A reinforcing sheet as in claim 1 wherein the columns are formed of aluminum.

13. A reinforcing sheet as in claim 1 wherein the honeycomb member comprises a multitude of hollow hexagonal cells.

14. A reinforcing sheet as in claim 1 wherein the honeycomb member has a thickness of 1/16 inch to 4 inches.

15. A reinforcing sheet as in claim 1 wherein the honeycomb member has a thickness of $\frac{1}{8}$ inch to $\frac{3}{4}$ inch.

16. A reinforcing sheet as in claim 1 wherein the honeycomb member is flat.

17. A reinforcing sheet as in claim 1 wherein the honeycomb member is contoured to conform to the shape of the panel to be reinforced.

* * * * *